United States Patent [19]

Couder et al.

[11] 3,963,870
[45] June 15, 1976

[54] TIME-DIVISION MULTIPLEX SWITCHING SYSTEM

[75] Inventors: Alain Audre Couder, La Gaude; Gerald Lebizay, Cagnes-sur-Mer, both of France

[73] Assignee: International Business Machines Corporation, Armonk, N.Y.

[22] Filed: Feb. 26, 1974

[21] Appl. No.: 446,044

[30] Foreign Application Priority Data

Mar. 1, 1973 France .............................. 73.08009

[52] U.S. Cl. ...................... 179/15 AT; 179/18 ES; 179/15 AQ
[51] Int. Cl.² ........................................... H04J 3/00
[58] Field of Search ...... 179/15 AQ, 15 AT, 15 BA, 179/18 GF, 18 ES

[56] References Cited
UNITED STATES PATENTS

| | | |
|---|---|---|
| 3,308,240 | 3/1967 | Von Sanden .................. 179/15 AT |
| 3,458,659 | 7/1969 | Sternung ........................ 179/15 AQ |
| 3,519,756 | 7/1970 | Harms ............................ 179/15 BY |
| 3,632,883 | 1/1972 | Aagaard ........................ 179/15 AQ |
| 3,643,030 | 2/1972 | Sparrendahl .................. 179/15 BA |
| 3,715,505 | 2/1973 | Gordon .......................... 179/15 AQ |
| 3,761,894 | 9/1973 | Pile ................................ 179/15 AQ |

Primary Examiner—Kathleen H. Claffy
Assistant Examiner—E. S. Kemeny
Attorney, Agent, or Firm—Frederick D. Poag

[57] ABSTRACT

Two-way links communication capability between time-division multiplexed subsystems is provided via dual time division address and data busses correlated by a recirculating memory having sections respectively associated with the address busses. Addresses on the address busses are recognized by the individual subsystems and further decoded to gate data to and from the busses data according to time slots assigned to terminal devices in the subsystems. The dual bus arrangement provides a full-duplex link in the sense that there is simultaneous communication via the two data busses, one each way.

10 Claims, 3 Drawing Figures

TIME-DIVISION MULTIPLEX SWITCHING SYSTEM

BACKGROUND OF THE INVENTION

1. Field of the Invention:

This invention relates to a switching system for interconnecting any two terminals of a communication network and, more particularly, a switching system which uses an arrangement of data and address buses allowing the switching function to be performed in a simpler and more efficient manner.

2. Prior Art:

This invention can advantageously be used in those communication networks which consist of several sub-systems comprising each a number of transmitting/receiving devices, which may be, for example, telephone sets in the case of a telephone network, or computer terminals in the case of a data transmission network. Said devices transmit and receive information via time-division multiplexed links. Any suitable type of modulation, for example, pulse-code modulation (PCM), in which the complex waveform of the signal to be transmitted is sampled, quantized and coded in digital form, can be used to convey the information on such links, except where a communication system between a computer and its peripheral units is involved since, obviously, the original information would already be in digital form. The present invention permits achievement of full-duplex communication between two transmitting/receiving devices in two distinct sub-systems.

U.S. Pat. No. 3,632,883 describes a telecommunication exchange with time-division multiplex for conducting information received on a channel of a time-multiplexed communications trunk to a selected channel of a second time-multiplexed communications trunk. The information from all channels is sequentially stored in a cyclic storage register in fixed relationships with cyclic code numbers generated by a local clock generator. At a clock instant determined by the address of an output channel, the address of an input channel is serially introduced into a second cyclic register. The output of the second cyclic register is decoded and used to switch the output of the first cyclic register corresponding to the selected input channel to an output line.

However, one of the drawbacks of such an approach, as described in said patent, is that it does not permit achievement of a full-duplex link.

SUMMARY OF THE INVENTION

It is, therefore, an object of the present invention to provide a switching system capable of operating in full-duplex mode.

Another object of this invention is to provide a switching system that is both simple and efficient.

Still another object of this invention is to provide a switching system of the non-blocking type capable of serving a large number of lines.

In accordance with the aforementioned objects, the present invention provides a switching system allowing a device which transmits and receives information over a multiplex link of the network to communicate with another device transmitting and receiving information over another multiplex link. All multiplex links of the network are connected through adapters to a set of buses consisting of two information buses and two address buses comprising a common multiplex link. The exchange of information between the two devices is effected via the information buses under control of the address buses which receive from a circulating memory the addresses of the devices to be interconnected and cause the corresponding information to be transferred to the information buses.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
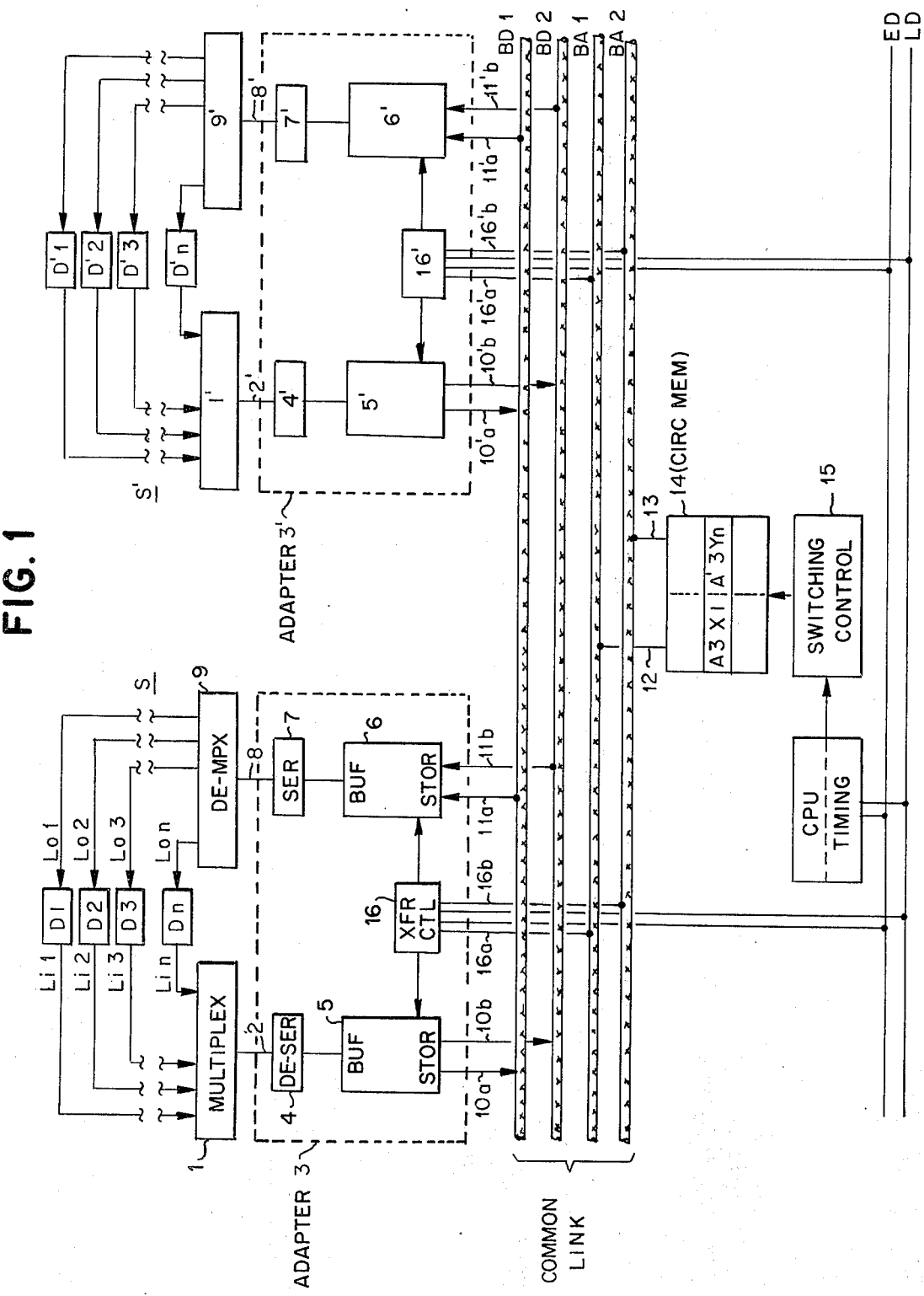
FIG. 1 is a schematic diagram illustrating the general arrangement of the switching system of the present invention, as used in a communications network.

Referring now to FIG. 1, there is depicted diagrammatically a part of a communications network incorporating the switching system of the invention. The complete network includes a plurality of sub-systems, two of which are shown by way of example in FIG. 1. The first sub-system, S, includes a number of transmitting/receiving devices, D1, D2, . . . , Dn, which may consist of telephone sets, and the second sub-system, S', is comprised of similar devices D'1, D'2, . . . , D'n. Each device is connected to a line Li, over which it transmits information, and to a line Lo, from which it receives information.

Lines Li1, Li2, . . . , Lin are connected to the input of multiplexing circuits 1, which generate on output line 2 a series of messages, the duration of each of which corresponds to one multiplexing frame. Each message consists of n characters and each character corresponds to a time slot allocated to each device.

Whether the network is used for transmitting and receiving voice or data signals, the multiplexing circuits can be made to perform a concentration function as only very rarely would all of the transmitting/receiving devices be busy at any one time. A concentration ratio of 3:1 would generally be adequate; for example, in a sub-system including 200 telephone sets, 64 time slots would be available on the multiplex links.

If the information provided by the transmitting/receiving devices is an analog form, the multiplexing circuits or the devices include an analog-to-digital converter which will supply digital information characters, and vice versa.

The principles of the time-division multiplexing method are well known and the multiplexing circuits will not be described in detail hereinafter.

The information provided by the transmitter/receiving devices is sent to an adapter 3 via multiplex channel 2. Adapter 3 includes a deserializer 4 which separates the various characters corresponding to each time slot and sends them to a buffer storage 5.

The information received by the transmitting/receiving devices is provided via a buffer storage 6 and a serializer 7, both of which form part of adapter 3, and also via a line 8 connected to demultiplexing circuits 9 whose outputs are comprised of lines Lo1, . . . , Lon.

All sub-systems are comprised of identical elements. Accordingly, the same reference numerals are used in FIG. 1 to identify corresponding elements in sub-systems S and S', those of sub-systems S' being differentiated by means of primes (').

Buffer storages 5 and 6 are connected via lines 10a, 10b and 11a, 11b, respectively, to information buses BD1 and and BD2. As shown in FIG. 1, lines 10a and 11a are connected to bus BD1 while lines 10b and 11b are connected to bus BD2.

The switching operation is performed under control of the address buses BA1 and BA2. These buses are connected via lines 12 and 13 to a circulating memory 14 controlled by switching control circuit 15.

Address buses BA1 and BA2 are also connected to a transfer control circuit 16 included in adapter 3. Circuit 16 allows the information to be selectively transferred between buffer storages 5 and 6 and buses BD1 and BD2.

Buffer storages 5 and 6 comprise a number of storage locations whose addresses correspond to the time slots allocated to the transmitting/receiving devices.

The entire network operates under control of a central processing unit (CPU) which provides commands to switching control circuit 15 and can sense signaling pulses generated by the transmitting/receiving devices to initiate switching operations.

The operation of the system of the present invention will now be described. Assume for purposes of example that one of the devices of the first sub-system, such as D1, wishes to communicate with one of the devices of the second sub-system, such as D'n. As a result, signaling pulses including the address of D1 and that of D'n are sent to switching control circuit 15. This signaling operation can be preformed in a number of ways depending upon the type of communications network involved.

The signaling operations form no part of the present invention and will not be described in detail. However, in the case of a telephone system, they may be performed as described below.

The telephone lifting and dialing operations may be detected at the level of the lines by a microprocessor indirectly linked with the CPU, to which the corresponding information is sent. On the basis of such information, the CPU causes ring back signals to be sent to the calling party through the microprocessor and further causes the called party's telephone to ring. The connection between the two stations is then set up in accordance with the invention.

Switching control circuit 15, which operates under control of the CPU, as previously mentioned, allocates a time slot, for example X1, in the pair of multiplex links associated with D1, and a time slot, for example Yn, in the pair of multiplex links associated with D'n. Knowing that the particular devices to be interconnected are D1 and D'n, the CPU also knows the adapters to which they are connected. Assume that their respective addresses are A3 and A'3. The present system makes it possible to switch from time slot X1 to time slot Yn. To this end, circuit 15 writes the address of the calling party, namely A3, X1, in a first storage area of the circulating memory, and the address of the called party, namely A'3 Yn, in a second storage area of that memory. These addresses are periodically and simultaneously applied, via output lines 12 and 13, to address buses BA1 and BA2, and are, therefore, sent to the transfer control circuits 16 and 16' of adapters 3 and 3', respectively. The switching system thus associates, by their rank in the circulating memory, A3X1 with A'3Yn as coordinate addresses identifying points between which communication is to be effected.

The control circuit which recognizes the presence on address bus BA1 of the address of the adapter in which it is located, in this case the address of adapter 3, causes the information stored in location X1 of buffer storage 5 to be transferred to information bus BD1, and the information present on information bus BD2 to be transferred to address location X1 of buffer storage 6. Simultaneously, the control circuit which recognizes the presence on address bus BA2 of the adapter in which it is located, in this example control circuit 16' of adapter 3', causes the information stored in location Yn of buffer storage 5' to be transferred to information bus BD2, and the information present on bus BD1 to be transferred to address location Yn of buffer storage 6'.

The information is then fetched from the storage locations and sent to the interconnected telephone sets. Thus, a two-way interchange is periodically achieved so as to provide full-duplex communication.

The present switching system is preferably used to enable two transmitting/receiving devices which do not belong to the same sub-system to be interconnected, and conventional switching means, which form no part of the present invention and are not shown in the drawings, may be used to interconnected two devices in one given sub-system.

Figure 2:
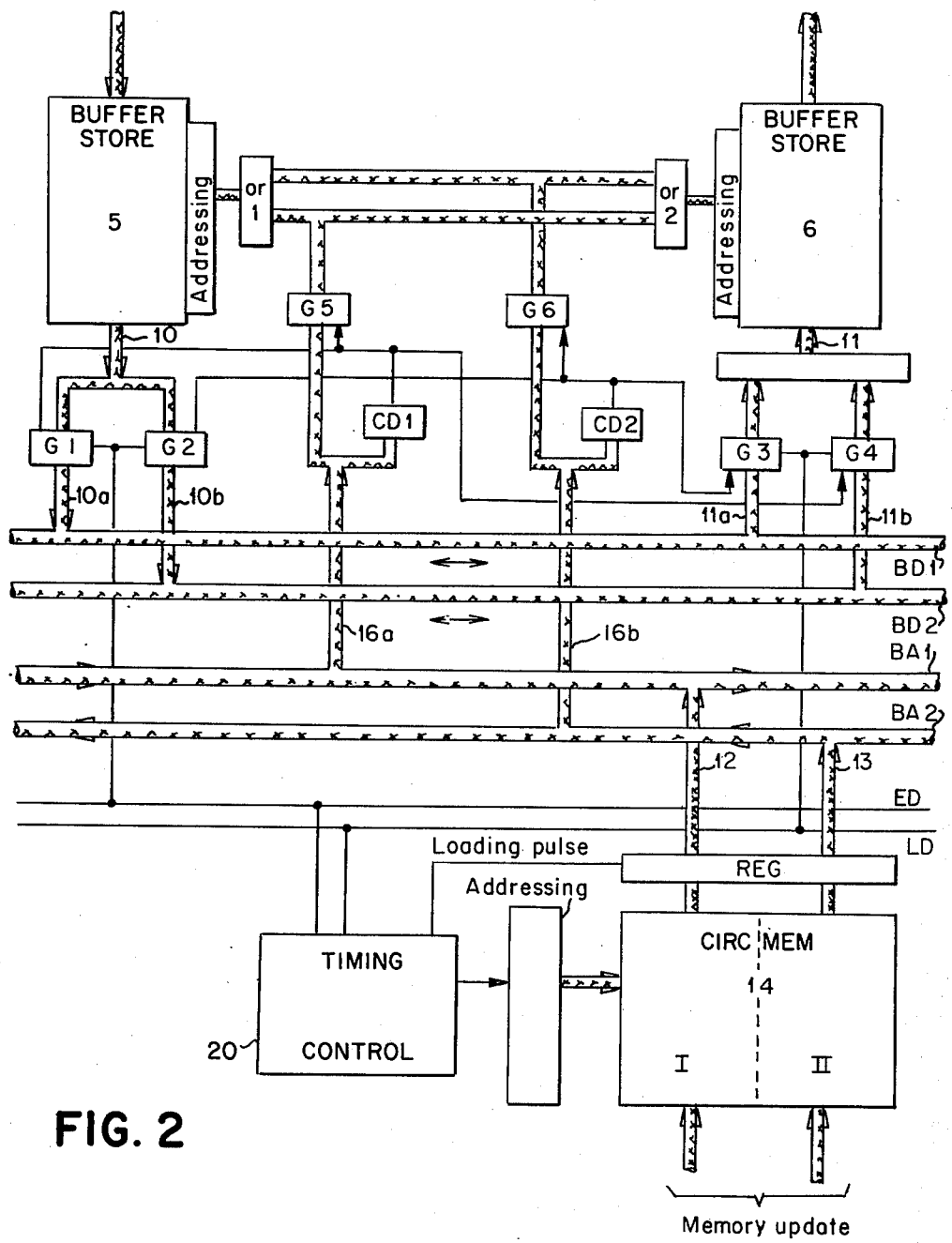
FIG. 2 is a schematic diagram illustrating in greater detail one of the adapters of FIG. 1.
Figure 3:
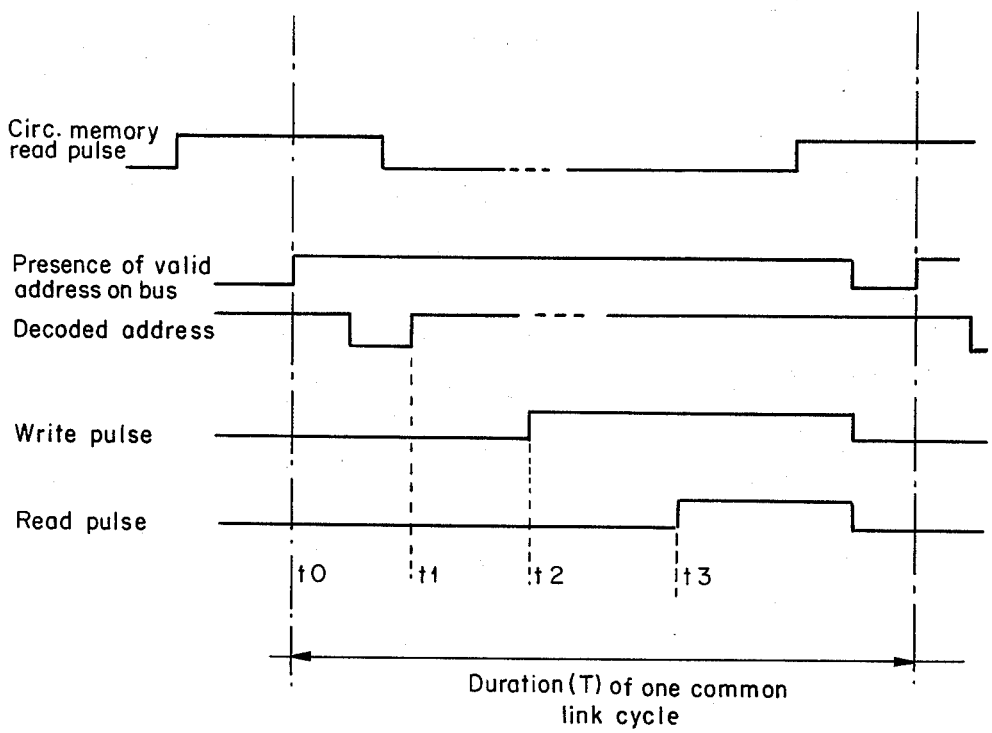
FIG. 3 is a timing diagram illustrating the timing relationships between the various operations.

Referring now to FIGS. 2 and 3, there is depicted a more detailed diagram of an adapter and a timing diagram, respectively.

For simplicity, a single adapter is shown in FIG. 2, but in the following description of the operation of the system, reference will be made to a second, similar adapter; corresponding elements will be identified by the same numerals, those of the second adapter being differentiated by means of primes (').

FIG. 2 is a detailed diagram of an adapter such as adapter 3 of FIG. 1. The various operations described earlier are performed under control of a timing circuit 20 providing on its different outputs the pulses shown in FIG. 3 whose duration is sufficient to cause the information to be selectively transferred at appropriate instants.

The transfer control circuit 16 includes decoding circuits CD, gates G, and OR circuits.

In addition to being connected to the information and address buses shown in FIG. 1, control circuit 16 operates under control of timing circuit 20 via Information Write line ED and Information Read line LD.

When one of the transmitting/receiving devices connected to adapter 3 desires to communicate with a similar device in another sub-assembly, signaling pulses representing the addresses of both devices are sent to switching control circuit 15 (not shown in FIG. 2), which causes the contents of circulating memory 14 to be updated.

As previously mentioned, memory 14 will store address A3 X1 in a first storage area, I, and address A'3 Yn in a second storage area, II.

During each memory cycle, these addresses will appear at the output of the memory and be loaded in a register REG under control of a loading pulse generated by timing circuit 20.

Said addresses will then be sent via buses 12 and 13 to address buses BA1 and BA2, the address formerly stored in area I being applied to bus BA1 and the address formerly stored in area II being applied to bus BA2. Both addresses remain present on these buses during a time interval nearly equal to the full duration of a common link cycle (as illustrated in FIG. 3) and will be decoded as explained below.

Assuming that the address in storage area I, i.e. A3 X1 in this example, corresponds to that of the adapter in FIG. 2, the A3 portion of the address will be recognized by the decoding circuit CD1, thereby causing gate G5 to open and one of the respective inputs of gates G1 and G4 to be activated. Thus, the complete address present on bus 16a will be sent to OR circuits OR1 and OR2, and will cause the storage locations that correspond to X1 in buffer storages 5 and 6 to be addressed. The information contained in that storage location of buffer storage 5 will be applied to output bus 10 and transmitted through gate G1 when a write pulse (shown in FIG. 3) generated by timing circuit 20 is applied thereto.

Simultaneously, the decoding circuit CD'2 of the adapter 3' which controls the transmitting/receiving device called D'n in this example will recognize address A'3 and, as a result, will cause gate G'6 of adapter 3' to open and one of the respective inputs of gates G'2 and G'3 to be activated. Address A'3 Yn will be sent via bus 16'b to OR circuits OR'1 and OR'2 to cause the corresponding storage locations of buffer storages 5' and 6' to be addressed. The information present in this location of buffer 5' will then be transferred via gate G'2 to information bus BD2 while the write pulse is present.

At a subsequent instant, the read pulse will cause the second input of gate G4 (in adapter 3) and the second input of gate G'3 (in adapter 3') to be activated, and the information present on bus BD2 will be transferred to the storage location corresponding to X1 in buffer storage 6 while the information present on bus BD1 will be transferred to the storage location corresponding to Yn in buffer storage 6.

The manner in which the addressing is performed is well known and will not be described herein.

FIG. 3 illustrates the timing relationships between the various operations. The duration of one operation cycle over the common link is defined as T. The content of the circulating memory 14 is read before the beginning of a cycle to assure that the addresses are present on buses BA1 and BA2 as the cycle begins. As the figure shows, these addresses remain present on the bus during a time interval nearly equal to T. The addresses are decoded at instant $t1$. The write pulse occurs on ED at the next instant, $t2$, to assure that the addresses are properly decoded before the information is transferred to the memory. The read pulse occurs at the next instant, $t3$, to assure that the information is stored in the memory after being transferred to the buses.

The system described above permits to perform high-speed switching operations. With the technologies currently used to manufacture logic circuits, an interchange can be achieved within 150 nanoseconds.

While the invention has been particularly shown and described with reference to a preferred embodiment thereof, it will be understood by those skilled in that art that the foregoing and other changes in form and detail may be made therein without departing from the spirit and scope of the invention.

What is claimed is:

1. A switching system for a communications network consisting of a plurality of sub-systems comprising each several devices which transmit and receive information over a transmission multiplex link and a reception multiplex link, said system being characterized in that it includes:
    a link common to all sub-systems and comprising a first and a second information buses, a first and a second address buses, and a synchronization bus;
    a circulating memory comprising two storage areas in which are sequentially stored the addresses of said devices forming part of different sub-systems and desiring to communicate with one another, said two storage areas being respectively connected to said two address buses to provide coordinate addresses thereto;
    one adapter per sub-system to which are connected said transmission multiplex link and said reception multiplex link, and which is itself connected to said two information buses and said two address buses, said adapter comprising means responsive to the address information sent over said address buses by said circulating memory to allow information to be periodically exchanged between two of said devices forming part of two sub-systems via said two information buses.

2. A switching system in accordance with claim 1, characterized in that said first storage area serves to store the address of the adapter to which is connected one of said devices forming part of one of said sub-systems and wishing to communicate with another of said devices forming part of another of said sub-systems as well as the address of the time slot allocated thereto in the multiplex link, and in that said second storage area serves to store the address of the adapter to which the called device is connected as well as the address of the time slot allocated thereto in its multiplex link.

3. A switching system in accordance with claim 2, characterized in that the address stored in said first storage area is periodically applied to said first address bus, and in that the address stored in said second storage area is periodically applied to said second address bus.

4. A switching system in accordance with claim 1 characterized in that each of said adapters includes:
    a first buffer storage comprising storage locations corresponding to the time intervals during which said devices transmit, said buffer storage receiving information from the transmission multiplex link and being capable of providing information either on a first line connected to said first information bus or on a second line connected to said second information bus;
    a second buffer storage comprising storage locations which correspond to the time slots allocated to said devices connected to said adapter and which may receive information either from a first line connected to said first information bus or from a second line connected to said second information bus, said second buffer storage sending information over said reception multiplex link; and
    an information transfer control circuit connected to said two address buses to recognize the addresses present on said buses and, in accordance with said addresses, to cause the information to be transferred between said buffer storages and said information buses.

5. A switching system in accordance with claim 4, characterized in that the control circuit associated with an adapter comprises decoder means responsive selectively to the addresses on the two address buses, and that when said decoder means recognizes the address of that adapter in the address present on said first address bus, said control circuit causes the information stored in said first buffer storage, at the address then present on said first address bus and corresponding to the time slot allocated to the calling device, to be transferred to said first information bus, and further causes the information present on said second information bus to be transferred to the second buffer storge address corresponding to the time slot allocated to the calling device.

6. A switching system in accordance with claim 5, characterized in that the control circuit associated with an adapter comprises decoder means responsive selectively to the addresses on the two address buses, and that when said decoder means recognizes the address of said adapter in the address present on said second address bus, said control circuit causes the information stored in said first buffer storage, at the address then present on said second address bus and corresponding to the time slot allocated to the called device, to be transferred to said second information bus, and further causes the information on said first information bus to be transferred to the second buffer storage address then present on said second address bus and corresponding to the time slot allocated to the called device.

7. A switching system in accordance with claim 4 of the preceding claims, characterized in that the link periodically established between two of said devices is a full-duplex link.

8. A switching system in accordance with claim 4, characterized in that said information transfer control circuit includes two address decoding circuits connected to said two address buses, and further includes gate circuits arranged in such a way as to cause information to be selectively transferred between said buffer storages and said information buses.

9. A system in accordance with claim 1, characterized in that said devices are telephone sets used in a telephone system.

10. A system in accordance with claim 1, characterized in that the transmitted signals are coded by means of the pulse-code modulation method.

* * * * *